(12) United States Patent
Valoteau et al.

(10) Patent No.: US 7,639,115 B2
(45) Date of Patent: Dec. 29, 2009

(54) METHOD FOR MATCHING BIDIRECTIONAL OBJECTS

(75) Inventors: Francis Valoteau, Annecy (FR); Valerie Maistre, Thyez (FR); Capucine Autret, Marnaz (FR)

(73) Assignee: Somfy SAS, Cluses (FR)

( * ) Notice: Subject to any disclaimer, the term of this patent is extended or adjusted under 35 U.S.C. 154(b) by 31 days.

(21) Appl. No.: 10/503,697

(22) PCT Filed: Feb. 7, 2003

(86) PCT No.: PCT/FR03/00389

§ 371 (c)(1),
(2), (4) Date: Aug. 5, 2004

(87) PCT Pub. No.: WO03/069573

PCT Pub. Date: Aug. 21, 2003

(65) Prior Publication Data

US 2005/0088275 A1  Apr. 28, 2005

(30) Foreign Application Priority Data

Feb. 11, 2002  (FR) ................................. 02 01630

(51) Int. Cl.
*G05B 23/02* (2006.01)

(52) U.S. Cl. .................. 340/3.71; 340/3.7; 340/825.22; 340/825.69; 341/176

(58) Field of Classification Search .................. 340/825, 340/3.1, 3.7, 3.71, 10.1, 825.22, 825.25, 340/825.69, 825.72; 341/176; 348/107, 348/734; 398/107, 108
See application file for complete search history.

(56) References Cited

U.S. PATENT DOCUMENTS

| | | | |
|---|---|---|---|
| 3,639,755 A * | 2/1972 | Wrege ..................... 246/187 B |
| 4,529,980 A | 7/1985 | Liotine et al. |
| 4,750,118 A | 6/1988 | Heitschel et al. |
| 5,148,159 A | 9/1992 | Clark et al. |
| 5,797,085 A | 8/1998 | Beuk et al. |
| 5,909,183 A * | 6/1999 | Borgstahl et al. ...... 340/825.22 |
| 5,959,539 A * | 9/1999 | Adolph et al. ............... 340/3.5 |
| 6,020,829 A * | 2/2000 | Hormann ............... 340/825.69 |
| 6,028,866 A | 2/2000 | Engel et al. |
| 6,049,289 A | 4/2000 | Waggamon et al. |
| 6,567,032 B1 * | 5/2003 | Mullaly et al. ............. 341/176 |
| 6,721,552 B1 * | 4/2004 | Jamieson et al. ........... 455/403 |
| 6,791,467 B1 * | 9/2004 | Ben-Ze'ev ............. 340/825.69 |

FOREIGN PATENT DOCUMENTS

| | | |
|---|---|---|
| EP | 0 651 119 B1 | 5/1995 |
| JP | 2001-145163 A | 5/2001 |
| WO | WO 01/71685 A1 | 9/2001 |

OTHER PUBLICATIONS

English translation of abstract of JP2001145163(A), May 25, 2001.

* cited by examiner

*Primary Examiner*—Edwin C Holloway, III
(74) *Attorney, Agent, or Firm*—Husch Blackwell Sanders Welsh & Katz

(57) ABSTRACT

A method for pairing a bidirectional object acting as a command receiver with a bidirectional object acting as a command transmitter, includes the stages of: (a) temporary allocation of at least one bidirectional object acting as a command receiver to a bidirectional object acting as a command transmitter; (b) selection of a bidirectional object acting as a command receiver from among the temporarily assigned objects; and (c) pairing of the selected object.

26 Claims, 5 Drawing Sheets

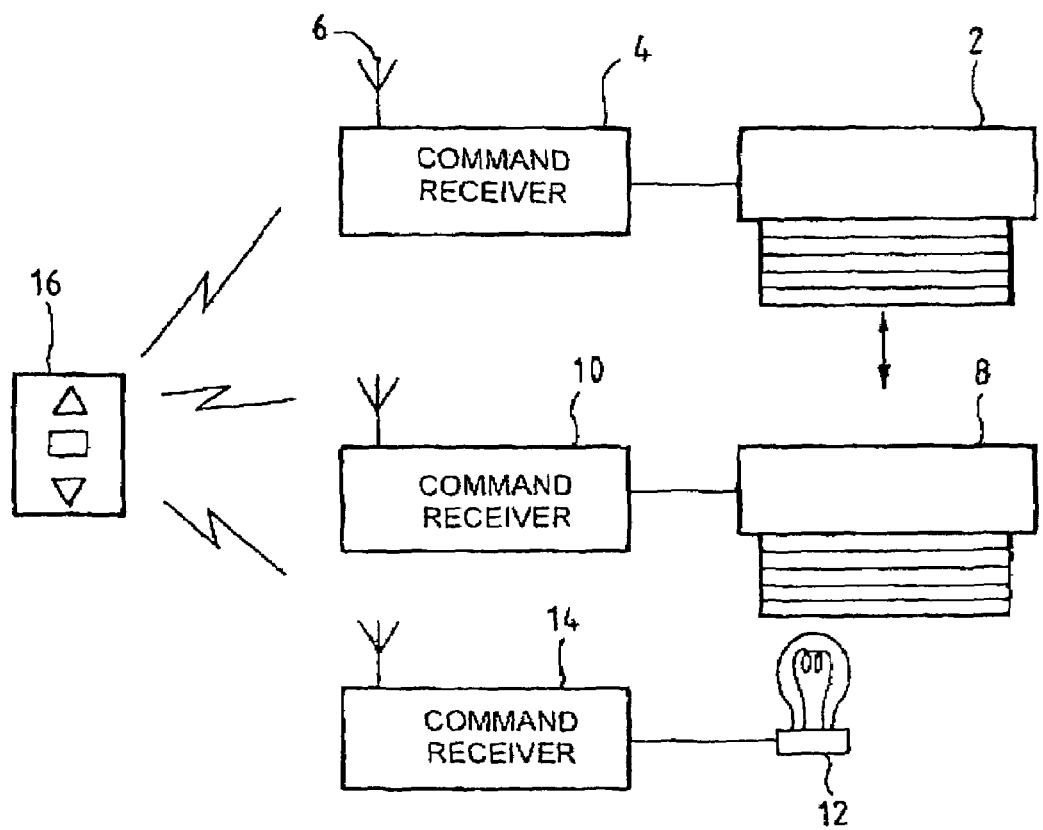
FIG_1
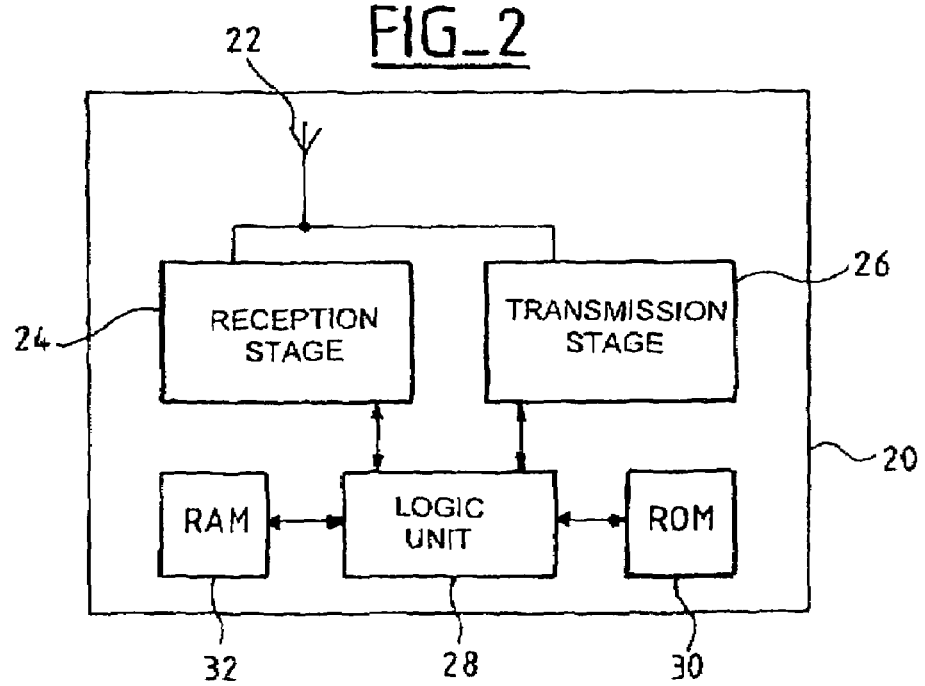
FIG_2

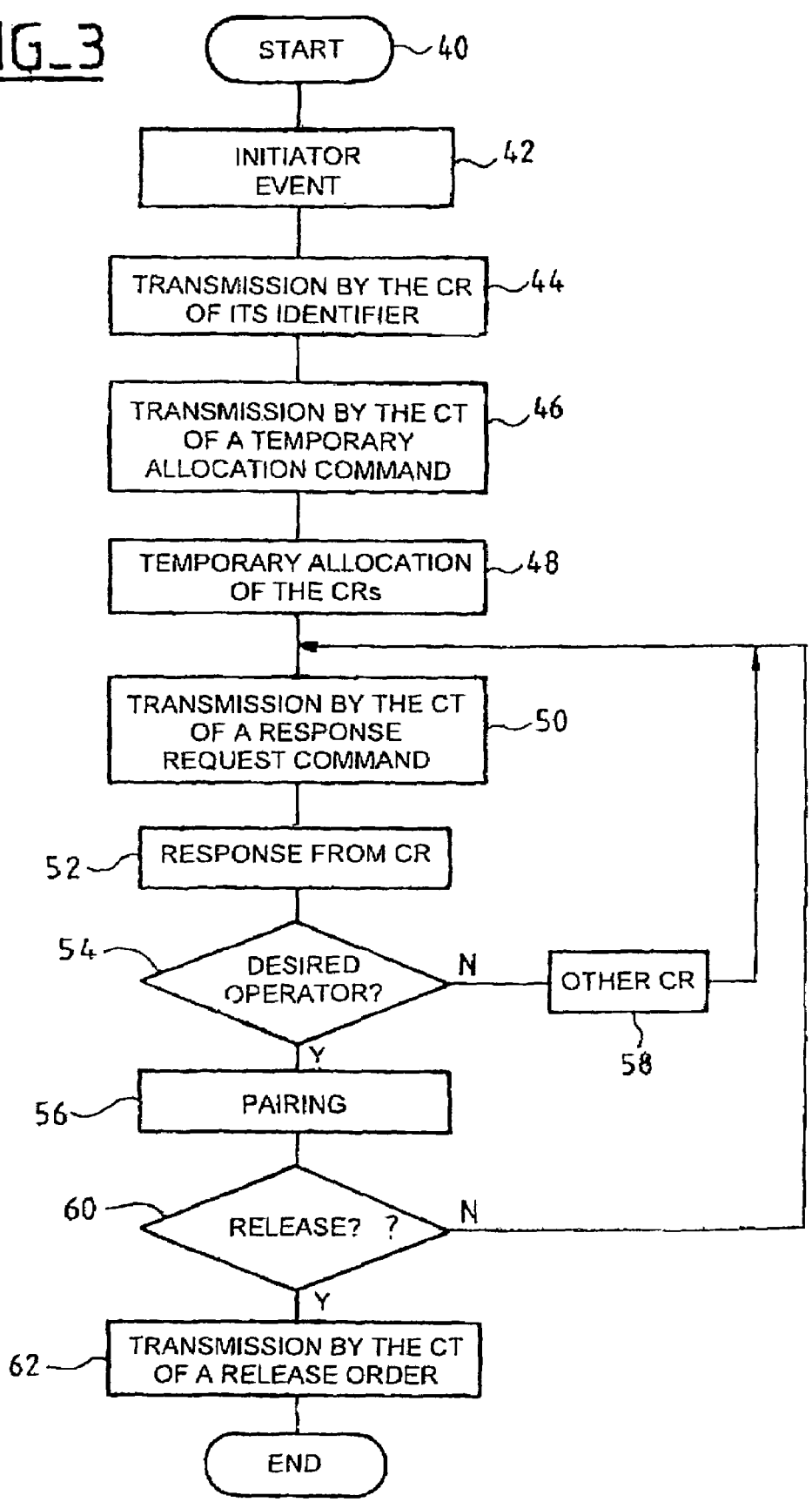

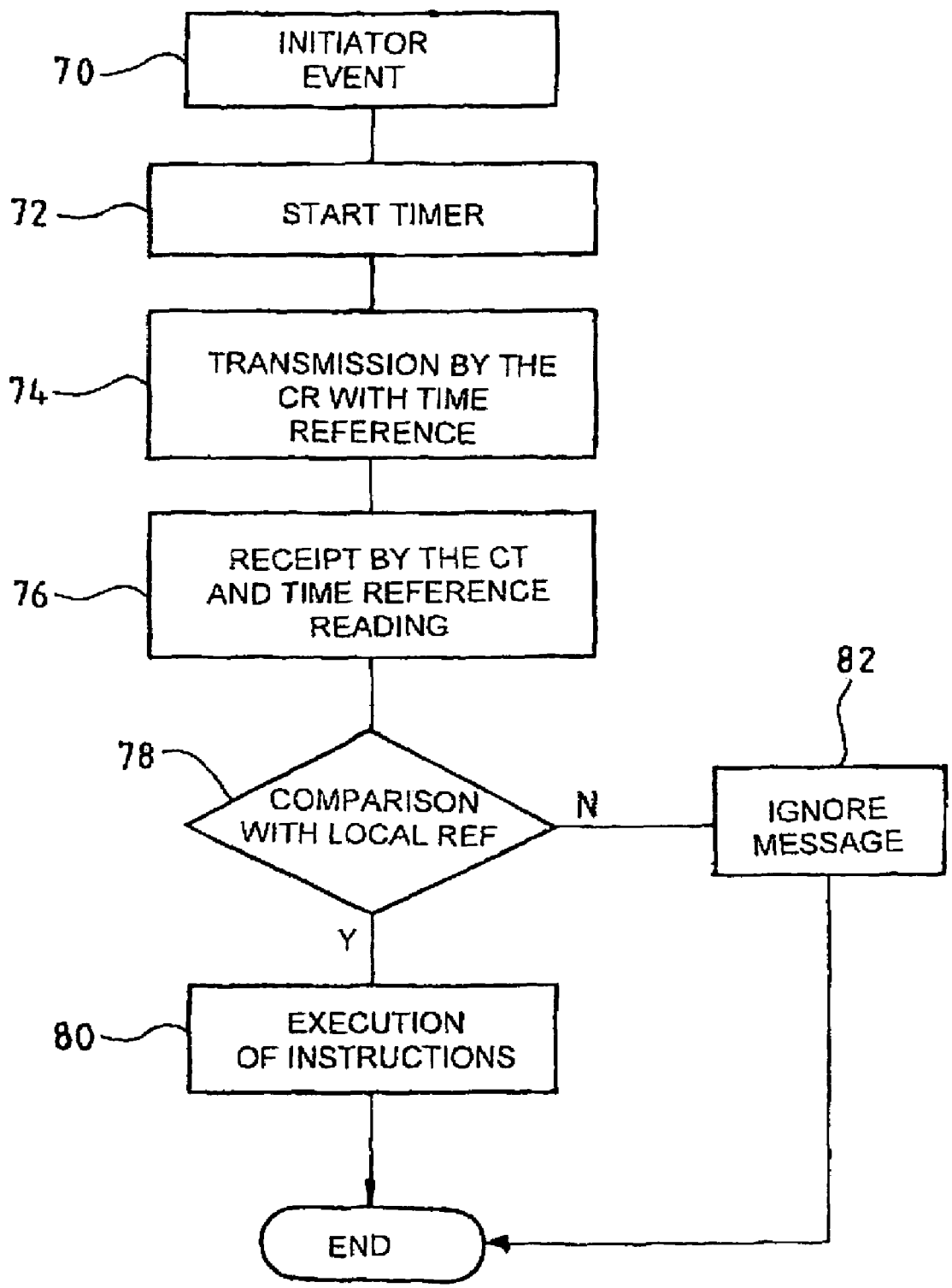

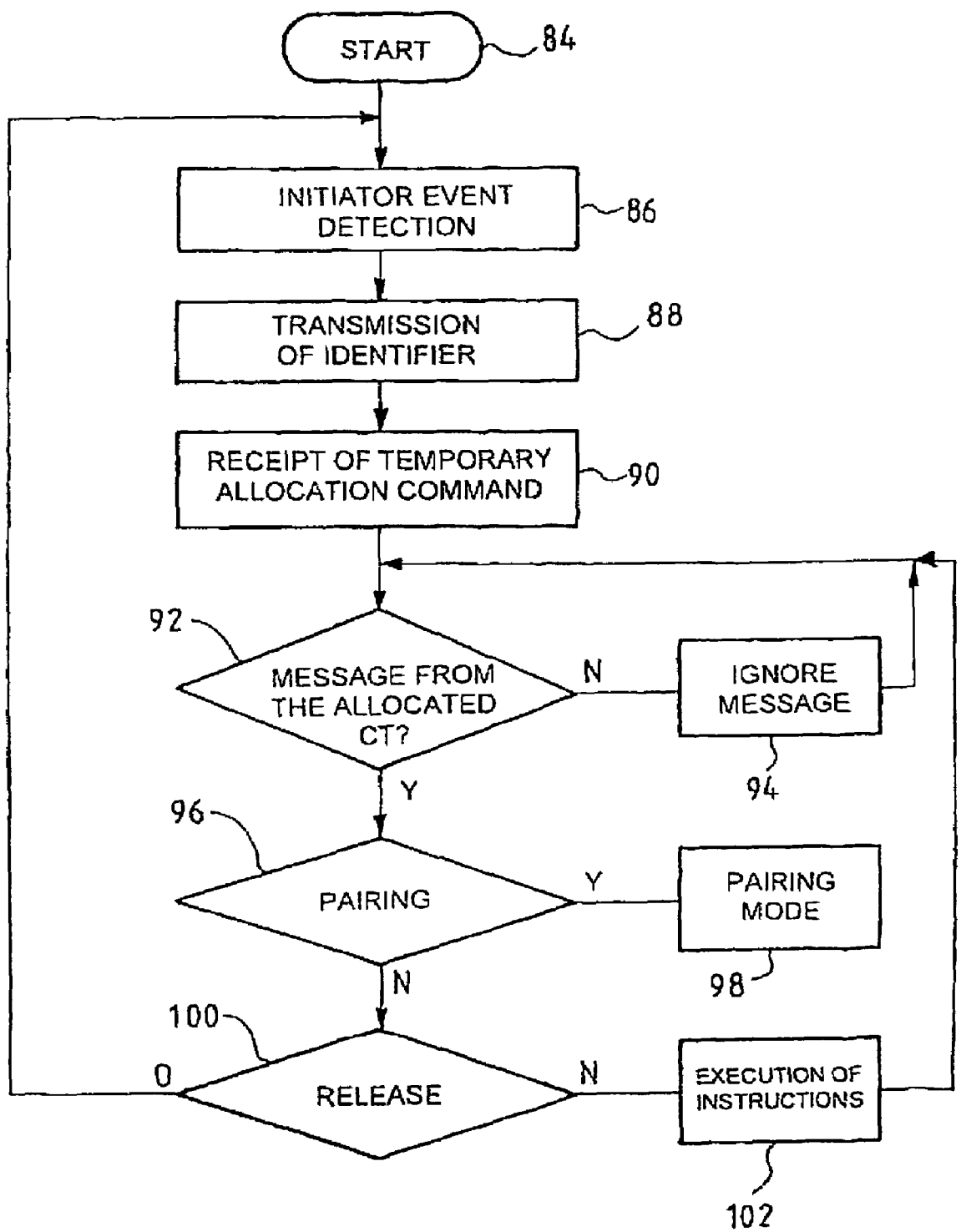
FIG_5

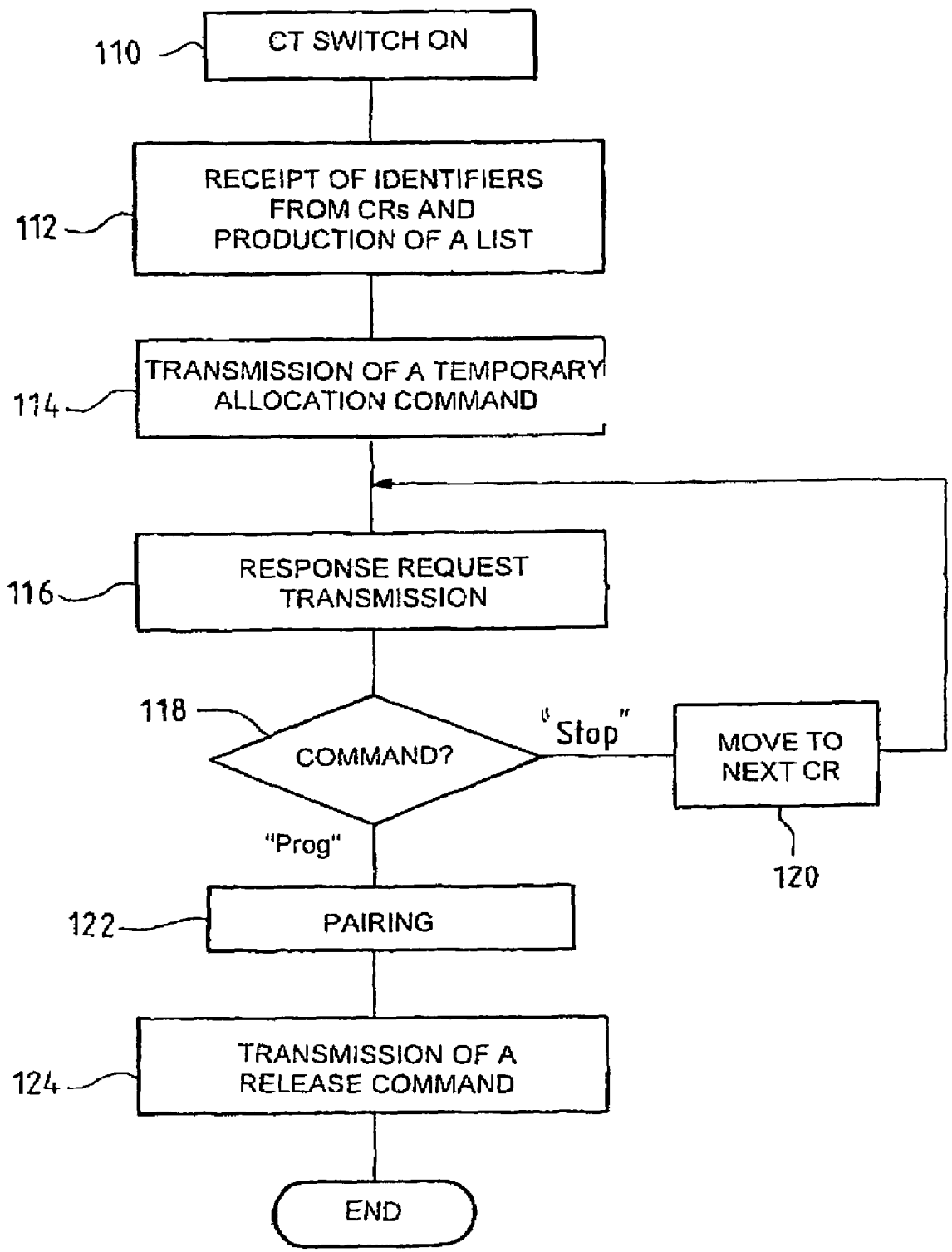

METHOD FOR MATCHING BIDIRECTIONAL OBJECTS

FIELD OF INVENTION

The invention relates to the field of transmitters of commands and receivers of commands having transmit and receive capabilities; it in particular relates to transmitters and receivers in home automation systems.

BACKGROUND

Such home automation systems are used for motorized products or automatic devices for closing or solar protection in the building, or for the control of lamps or other systems. Typically, one or more command transmitters are provided; each device to be controlled—rolling shutter, blind, lighting unit, etc.—is associated with a command receiver; it is also possible for provision to be made for several devices to be controlled by a same command receiver. The command transmitters and command receivers communicate by radio and use the same transmission frequency, or predetermined frequencies. For these devices, and in particular for motorized products or automatic devices for closing or solar protection in buildings, logistic reasons most often necessitate that the pairing is not performed during manufacture, but rather on the worksite, after installation of the products. Various pairing solutions are proposed in the state of the art.

Certain solutions relate the case where command transmitters are capable only of transmitting and where command receivers are capable only of receiving. U.S. Pat. No. 4,750,118 or U.S. Pat. No. 6,049,289 are examples of such solutions.

Other solutions use command transmitters and command emitters capable of transmitting and receiving; U.S. Pat. No. 4,529,980, or U.S. Pat. No. 5,148,159 are cited in particular.

WO-A-01 71685 discloses a universal remote controller, suited to controlling various units. Each unit contains a record of the various data necessary to allow the controller to manage it remotely, with a device code in particular; the record is copied into the universal controller. This document proposes that the controller interrogates the various units that it controls successively.

U.S. Pat. No. 5,797,085 describes a communication system in which the different objects are not paired. On the contrary, the objects are identical from the communication point of view and do not have an unique address.

EP-A-0 651 119 describes a set of transmitters and receivers, and mentions the pairing problem. Pairing is effected by learning a code for one transmitter from another transmitter. The two transmitters are placed side by side and the button for the channel in question is pressed on each transmitter, starting with the "teaching" transmitter. This gradual method of learning the codes is also applied to the receiver. The document envisages inhibiting the code teaching function on some transmitters.

U.S. Pat. No. 6,028,866 describes a communication system in which each device includes a communication identification, which is allocated in the factory or by the user. For a group constitution, a central device sends a message inviting devices to join the group. On receipt of an invitation message, a device responds as, appropriate with an acceptance message. The central device stores a list of the devices forming the group, i.e. the devices that have responded with an acceptance message. Said procedure for forming a group allows messages intended for the group to be sent.

The French patent application filed by the applicant on 13 Jul. 2001 under the number 01 09369 describes a method for pairing transmitter and receiver. This application specifies that an installer can be supplied with a programming console. Each of the receivers is thus also a transmitter, and the programming console is therefore not only a transmitter but also a receiver. In the pairing phase, receivers send an identification number which is unique to each of them to the console. The software contained in the console allows the receivers that are known to it to be classified. The installer therefore has the option to send commands successively, each of which will be recognised only by the single receiver in question, and then to pair said receiver, which is thus identified physically by responding to said command, with the transmitter intended to control it thereafter. In this solution, it is proposed that a specific console be used; this is not itself paired with the receiver, but which is used first to identify the receiver and then to pair the latter with the transmitter.

There is therefore a requirement for a method for pairing objects which are capable of sending as well as receiving which is both simple and reliable. Such a method must maintain its reliability even in a radio environment or heavily loaded network—for example in the presence of neighbouring products which have been configured previously, or neighbouring products undergoing configuration.

SUMMARY

In one embodiment, the invention therefore proposes a method for pairing a bidirectional object acting as a command receiver with a bidirectional object acting as a command transmitter, comprising the following stages:

(a) temporary allocation of at least one bidirectional object acting as a command receiver to a bidirectional object acting as a command transmitter;

(b) selection of a bidirectional object acting as a command receiver from said temporarily allocated objects; and (c) pairing of the selected object.

The selection and pairing stages can be repeated. A stage releasing the objects allocated temporarily distinct from the paired object or paired objects can then follow.

In one embodiment, the temporary allocation stage comprises:

(a1) in response to an initiator event, the sending of its identifier by at least one bidirectional object acting as a command receiver;

(a2) sending by a bidirectional object acting as a command transmitter of its identifier;

(a3) storage by a bidirectional object acting as a command receiver of the identifier of a bidirectional object acting as a command transmitter and (a4) storage by the bidirectional object acting as a command transmitter of the identifier of each bidirectional object acting as a command receiver.

In this case, the (a1) stage may include sending with the identifier a time reference dependent on the initiator event.

The (a4) stage may also include storage of the identifiers of bidirectional objects acting as command receivers having identical or similar time references.

In another embodiment, the selection stage comprises:

(b1) sending a response request command from the object acting as a command transmitter to one of the objects allocated temporarily;

(b2) a response from that object allocated temporarily to which the response request command is sent;

(b3) if the object that has responded is not the wanted object, repetition of the stage of sending a response request, but to another of the objects allocated temporarily.

The release stage may again comprise the release of objects allocated temporarily distinct from the paired object if a command is not received during a set period. Alternatively, the release stage may comprise the release of an object allocated temporarily on receipt of a pairing command directed to another object allocated temporarily or even the sending by the object acting as a command transmitter of a release command.

In one embodiment, the pairing stage comprises the pairing to the selected object of the bidirectional object to which the selected object was allocated. A bidirectional object differing from the bidirectional object to which the selected object was allocated may also be paired to the selected object.

The invention also proposes a method for operating a bidirectional object acting as a command receiver, comprising:
(a) a stage of temporary allocation to a bidirectional object acting as a command transmitter; and
as desired, either of the two stages of
(b) pairing to a bidirectional object acting as a command transmitter, or
(c) release, ending the temporary allocation.

In one embodiment, the temporary allocation stage comprises:
(a1) in response to an initiator event, sending an identifier;
(a2) reception of an identifier;
(a3) storage of the received identifier.

The sending stage may thus comprise the sending with the identifier of a time reference dependent on the instant of the initiator event.

Advantageously, the release stage should comprise release on receipt of a pairing command addressed to another object. Said release stage may also comprise release on receipt of a release command.

In one embodiment, the pairing stage comprises pairing to said bidirectional object acting as a command transmitter. However, pairing may also comprise pairing to a bidirectional object other than said bidirectional object acting as a command transmitter.

The invention also proposes a bidirectional object having:
a reception stage;
a transmission stage;
a logic unit controlling the transmission and reception stages and implementing said method of operation.

The invention also relates to a method for operating a bidirectional object acting as a command transmitter, comprising the following stages:
(a) sending a temporary allocation command;
(b) reception and storage of the identifier of at least one bidirectional object acting as a command receiver;
(c) sending a response request command to one of the objects whose identifier has been stored;
(d) depending on an instruction from the user, sending (116) of a pairing command to said object.

The stages of sending a response request and sending a pairing command can be repeated. After the pairing stage, a command can be sent releasing the objects whose identifiers have been stored, as distinct from a paired object to which the pairing request command has been sent.

Advantageously, the reception stage should comprise a comparison of the time references received with said identifiers and storage of identifiers having identical or similar time references.

Stage (c) may also comprise
(c1) sending a response request command to one of the objects whose identifiers have been stored;
(c2) sending a response request command to another of the objects whose identifiers have been stored;

and stage (d) may comprise sending a pairing command to the object to which the previous response request command was addressed.

It is also advantageous that stage (e) comprises the sending of a release command. At stage (d) the pairing command can contain another object's identifier.

Finally, the invention relates to a bidirectional object having:
a reception stage;
a transmission stage;
a logic unit controlling the transmission and reception stages and implementing said method of operation.

BRIEF DESCRIPTION OF DRAWINGS

Other characteristics and advantages of the invention will become apparent on reading the description which follows, given by way of example and by referring to the drawings which show FIG. 1, a schematic view of an installation according to the invention;

FIG. 2, a schematic view of the logic structure of a bidirectional object allowing implementation of the invention;

FIG. 3, a flow chart of a method of pairing according to the invention;

FIG. 4, a flow chart of a method to secure the definition of a group among the bidirectional objects;

FIG. 5, a flow chart of a method implemented in a command receiver; and

FIG. 6, a flow chart of a method implemented in the command transmitter.

DETAILED DESCRIPTION

In the description which follows, the invention is described in an example of its application to the pairing of home automation systems; it is not limited to such systems; it can also be used for purposes other than pairing. Hereinafter, the terms "command transmitter" and "command receiver" are used to describe objects whose function is to transmit or receive commands given by a user; said descriptions are not representative of "transmitter" or "receiver" functionalities which, from the point of view of the signals, are capable both of sending and receiving. The term "bidirectional object" thus could have been used, i.e. an object having both transmit and receive capabilities. For clarity in the explanation, the terms "transmitters" and "receivers" are used—which only represent the allocation of a given bidirectional object to a particular use.

It is also assumed in the following description that each bidirectional object is given an univalent identifier; this may be an identifier corresponding to an object code set in the factory and which cannot be changed; it may also be a number which can be changed, such as a random number chosen in the object or even a number chosen using micro-switches. The origin of the identifier has no effect on the functioning of the method. It will also be noted that the identifier used hereinafter may be changed after pairing; it is simply used to identify the object during pairing.

FIG. 1 shows a schematic view of an installation in an initial example of the implementation of the invention. The installation includes an operator 2. Said operator can, for example, roll blinds up or down, open or close rolling shutters or a garage door, switch a light on or off, open a door, trigger or clear an alarm, etc. The operator is connected to a command receiver 4, referenced in the figure by the letter "R". The command receiver has an antenna 6 which allows it to receive commands sent by radio link from a command transmitter, the command receiver 4 can moreover transmit signals, for example by radio link, using the same antenna 6. The transmission by radio of commands from a transmitter to a receiver or vice versa is known per se and is not described here in more detail.

FIG. 1 also shows a plurality of operators 8, 12, each with their command receiver 10, 14. It also shows a command transmitter 16; this is suited to transmitting by radio link one or more commands addressed to the receivers 4, 10, and 14 and has an antenna for this purpose (not shown). Typically, a command transmitter, in the case of controlling a rolling shutter, can transmit commands to raise or lower the shutter, or to stop the shutter; other commands can also be given, such as placing the shutter in pre-programmed positions, commands for programming the shutter, etc. The command transmitter thus has one or more devices allowing the user to enter a command, in the simplest case one or more control buttons. The command transmitter is also capable of receiving signals from the command receiver(s); as with the command receiver, the same antenna is used.

Thus, according to the command received from the user, its operating program and/or signals received from the command receivers, the command transmitter sends signals, as explained below.

A number of transmit or receive channels can be provided for the command transmitter and the command receiver; in a simple configuration, radio is used, and thus the transmitter as a sender is a "transceiver", i.e. a transmitter and a receiver.

The problem for the invention is to pair a command transmitter to a command receiver, or in other words to ensure that commands sent by any command transmitter allow the operator to be switched on or off by means of the command receiver—while commands sent by other command transmitters have no effect. Once such pairing is effected, there are solutions which allow other command transmitters to be added, for example, to create a general command, i.e. a command transmitter capable of commanding a number of command receivers.

To this end, the invention proposes that a command receiver sends its identifier when an initiator event is present. Subsequently, if a command is received from a command transmitter, the command receiver is allocated temporarily to said command transmitter; in other words, it does not respond, or no longer responds, to commands received from other command transmitters; the allocation is merely temporary and thus is not a pairing.

Said "temporary allocation" is used to pair a command receiver that has been subjected to an initiator event, even in a dense radio environment in which numerous messages are sent.

In terms of states, a command receiver therefore has three distinct states. In the first state, the receiver is not paired. In the second state, the command receiver is allocated temporarily to a command transmitter. The third state is a pairing state. The command receiver moves from the first state to the second state after the initiator event, when it receives a command from the command transmitter. The command receiver moves from the second state to the third state when it receives a pairing command. As shown below, once the command receiver is in the third state, it no longer responds to an initiator event.

FIG. 2 is a schematic view of the logic structure for a bidirectional object used as a command transmitter or as a command receiver. In the example shown, the object is a "transceiver" and sends and receives signals by radio link, using a single antenna. The object 20 therefore has an antenna 22, a receive stage 24, linked to the antenna; the receive stage receives signals picked up by the antenna 22. It also has a transmit stage 26, it is also linked to the antenna 22, which transmits signals to be transmitted to the antenna. The transmit and receive stages are controlled by a logic unit 28, such as a microprocessor, which is capable of executing a program stored in a memory 30, typically a read-only memory. The object also has a read-write memory 32 whose content can be changed while the object is functioning.

According to its allocation as a command transmitter or as a command emitter, the power source feeding the object can vary; typically a command transmitter is a portable device, fed by a cell or battery; a command receiver is connected to the operator and is thus fed from the mains.

A command transmitter and a command emitter may also differ in the operating program stored in the memory 30—insofar as it is advantageous to limit the size of the memory 30, to differentiate the objects by loading into memory an operating program which is designed only for the sole functionalities of a command transmitter (or command receiver).

The identifier of the object is stored in the read-only memory 30, or can even be stored in the memory 32, if it is generated at random or otherwise.

The means which allow an object to respond to a user command are not shown; these may be buttons, contacts, switches or other, both for command transmitters and command receivers. It can also be envisaged that the object is sensitive to one or more power cuts; this is particularly advantageous for a command receiver, as shown below.

FIG. 3 is a flow chart for a method of pairing, in one embodiment of the invention. The start point (stage 40) is assumed to be the existence of a number of bidirectional objects intended to function as "command receivers" and a bidirectional object used as the command transmitter.

At stage 42, an initiator event is produced by the user; this is an external command—i.e. it is not sent by a command transmitter. For example, it may be a specific action on the command receiver power supply, typically a double break to the mains power. This solution has the merit of being simple to implement, insofar as command receivers are generally connected to the mains, as explained earlier. It is also conceivable that the initiator event results in a command receiver actioning a local command, or a local change to the branch power supplies; said solution in particular allows a command receiver to be re-paired, even if it had been paired beforehand. In every case, the initiator event is detected by the command receivers.

Receipt of a command sent by a command transmitter could also be used as an initiator event; said solution could be used to pair a command receiver from among those that could receive the command in question. This solution has the drawback that command receivers cannot be selected—unless it is assumed that they are already paired to a given command transmitter. The combination of an external command and a command sent by a command transmitter could also be used as the initiator event; the external command—for example a local action on the receiver—is used to select the command receivers that must respond; the command send by the command transmitter is used for synchronism, which can be useful, as described later.

At stage 44, in response to the initiator event, a command receiver that must be paired sends a signal representing its identifier and an indication which is available for pairing. As has just been mentioned, these may be command receivers which have never been paired previously; they may also be command receivers which have been paired previously and which need to be re-paired. The signal sent in this case is the most simple, formed from the identifier of the command receiver and a specific code signaling that it is available for pairing; an alternative is to send only the receiver identifier, in a specific format.

This transmission can be repeated at regular intervals for a predetermined period—for example 2 to 3 minutes. If a number of command receivers are sending—which is the most likely assumption—the conventional rules for detecting collision and repetition can be used during the transmission. The predetermined time is selected according to the rules of detection, collision or repetition, and the maximum acceptable number of command receivers transmitting during this stage.

On completion of this stage, the command receiver(s) that has/have received the initiator event have sent their identifier(s); in this way, an "auditor" of the signals sent recognises which command receivers have responded to the initiator event; a command transmitter active during stage 44 can thus build up a list of the command receivers that have transmitted during this stage.

At stage 46, a command transmitter is switched on and sends a signal representative of its identifier and a temporary allocation command. The comments made at stage 44 on the structure of the signal sent remain valid, *mutatis mutandis*, for this signal and subsequently for the other signals transmitted.

Stages 46 and 44 can be reversed; this ensures that the command transmitter is active when the command receivers send their identifiers; conversely, the command transmitter can be set up before the initiator event, by "telling" it by means of a local action that it must "listen" for command receivers.

At stage 48, the command receivers that have transmitted their identifiers at stage 44 record the identifier of the command transmitter in a memory. For a predetermined period, said command receivers will refuse to obey any command which does not originate from this command transmitter. These receivers are therefore allocated temporarily to the command transmitter which sent the temporary allocation command at stage 46. It will be noted here that the identifier transmission by the command receiver at stage 46 is only to facilitate the temporary allocation of the command transmitter and the command receivers. A temporary identifier could be used for this single temporary allocation.

The predetermined time for the temporary allocation is used for the temporary pairing of a command transmitter and a command receiver; it can be fixed—and, in this case, the command receivers revert to normal operation on expiry of this period. As explained later, the temporary allocation may only cease on transmission by the command transmitter of a release command or of a command ending the temporary allocation.

On completion of this stage 48, the command receiver(s) that were identified at stage 44 and which received a temporary allocation command at stage 46 will now only obey commands received from the command transmitter; the command transmitter which sent the temporary allocation command itself has a list of command receivers. It thus becomes possible to proceed with the pairing, or any other manipulation involving the transmitter and the receivers, independently of the radio environment. This temporary allocation guarantees correct identification of the bidirectional objects in question, in a dense network or radio environment, in which numerous messages are sent by previously configured objects—for example, neighbouring apartments—or in which other objects in neighbouring installations can themselves be in a configuration phase.

The use of this temporary allocation for pairing will now be described. The pairing is based on scanning the list of command receivers built up during the preceding stages. The use of a screen for the scanning if the command transmitter is a genuine programming console is conceivable but, more simply, this will be by pressing a push button if the command transmitter is a simple remote control.

At stage 50, the command transmitter sends a signal representative of its identifier and a response request command addressed to a receiver in the list—for example the first on the list. The purpose of the response request is to allow the user to determine visually, audibly, or by any other method, the receiver addressed. If the command transmitter is a remote control, the Stop command can be used to send this signal.

At stage 52, on receipt of the response request command, the receiver concerned responds with a signal. This signal may be the abbreviated command from the operator controlled by the receiver concerned; such a signal allows the user to identify the receiver.

At stage 54, the user determines whether the signal sent at stage 52 has originated from the desired receiver or not. If this is the case, the next stage is 56, and if not, stage 58.

At stage 58, another receiver on the list is polled—for example, the next receiver. This corresponds to sequential scanning of the list; the list can also be scanned at random. The next move is to return to stage 50, to issue a fresh response request addressed to this other receiver. The same command from the command transmitter is used to move to another receiver.

At stage 56, the receiver to be paired has responded to the response request command. It is therefore possible to proceed with the actual pairing; this is done using the command transmitter allocated temporarily, by sending a signal representative of the transmitter identifier and a pairing command addressed to the receiver to be paired. An identification key can be sent from the command transmitter, another identifier to be used subsequently, or any other information necessary for the pairing. The Prog programming button on a remote control can be used.

The command transmitter is thus used as a simple programming console; in this case, a receiver becomes receptive to a pairing command after having responded to a response request command. A receiver remains in this state for a set period, until it receives a pairing command, or until it receives a fresh response request command from the command transmitter to which it is allocated temporarily and which is addressed to another receiver. Thus, at stage 56, the command receiver which has last responded to a response request command can be paired simply by sending a pairing command using the command transmitter to be paired; said solution has the advantage of allowing the scanning of the list to continue using the command transmitter used at stage 46, the command receiver which was the last to respond now being paired. Having been present during the pairing procedure, the command transmitter used as the programming console can exclude from the list of receivers the identifier of the command receiver now paired. Hence the same object can be used as a tool to nominate successively each object to be paired, but without being paired itself. This object can itself be very simple and does not have more control buttons than a traditional control point.

Regardless of the command transmitter to be paired, the command receiver stores in a memory the identifier of the command transmitter, in order that it can then respond to commands which it receives from it. It moves into a paired state, in which it no longer responds to an initiator event such as a double power cut, but only to a particular initiator event—a local action or even a re-pairing command from the command transmitter to which it is paired.

The pairing described summarily at stage 56 can be more complex and includes multiple exchanges between the transmitter to be paired and the receiver; new identifiers, authentication keys, encrypted data, a rotating code, or others, according to the authentication process used hereafter can be sent.

There are potential variants to these two pairing solutions; thus, there might be pre-pairing between the command transmitter used as the programming console and the command transmitter to be paired; in this case, for the pairing, the command transmitter used as the programming console would send an identifier to the command transmitter to be paired. This solution has the advantage of affording greater security, even if the command transmitter that has sent the temporary allocation command is not paired.

On completion of the pairing stage 56, a command transmitter is paired to the command receiver which last responded to the response request command. At stages 60 and 62, the other receivers allocated temporarily are released if appropriate. As explained earlier, these stages are not essential; the receivers can be programmed such that the temporary allocation ceases after a set period; the temporary allocation can also be ceased on receipt of a pairing command, even if addressed to another command receiver.

However, it is advantageous to give the user the option to continue pairing receivers from the list other than the one that has just been paired. This avoids the requirement to re-send the initiator event to pair the other receivers. At this stage 60, the user is prompted as to whether he wishes to release the other receivers. If this is the case, he moves to stage 62, where the release command is sent; if not, he returns to stage 50, in order to send a new response request command; stages 60 and 62 can be implicit; thus, if the command transmitter is used as a programming console, the stage 62 test consists simply of confirming whether the user has pressed the button again to send a response request command—which results in a move directly to stage 50. In the absence of such a response request command, a move to stage 62 would be the result, unless release was implicit on the elapsing of a set period. Conversely, it is equally conceivable that a new initiator event could be sent at stage 62, in the form a specific command addressed to receivers on the list as yet unmatched.

The method described at FIG. 3 allows certain pairing, regardless of the radio environment.

The method described can be used by referring to FIG. 4, to secure even more from this combination and avoid, in a complex installation, or neighbouring a complex installation, any overlapping of objects that may have been paired, although they do not belong to a single group. This method is used to define an initiator event with more certainty, in order thus to form a group among the bidirectional objects.

The method is based on the synchronous character of the initiator event; it proposes to use said event as a time reference; said reference allows a command receiver that has received the initiator event to be identified from its local time, measured against said time reference. It is thus sufficient that a command or a response sent by a command receiver is accompanied by an indication of the local time, as will now be described.

The synchronous initiator event is produced at stage 70; as explained earlier, this can be an external command—in the example, a given action on the mains. It may also be a combination of an external command and a command received from a command transmitter, as explained above.

At stage 72, each command receiver that has detected the initiator event starts a timer.

At stage 74, a command receiver sends a signal; this may be the signal from stage 44 of FIG. 3, or any other signal sent subsequently by the command receiver; said signal includes an indication from the timer, as well as the identifier of the command receiver. Hence the signal sent by the command receiver is dated with reference to the time reference that constitutes the initiator event.

At stage 76, the signal sent at stage 74 is received by the object to which it is addressed—for example the command transmitter. Therefore this also has the timer indication. At stage 78, this indication is compared with an indication calculated locally in the command transmitter; this indication results from a comparison with the time indications received from other command receivers. It may also come from a command transmitter timer—particularly if this originated the initiator event.

If the time indication of the received signal is consistent, the next move is to stage 80, in which the instructions or commands sent by the command transmitter are processed; conversely, if the time indication is inconsistent with the indication calculated locally, the next stage is 82. At stage 82, it is known that the signal sent at stage 76 is inconsistent and that the signal received at stage 76 did not come from a command receiver that had been subjected to the initiator event. The message or the instructions received are ignored.

The method of FIG. 4 thus allows the origin of a message to be identified with more certainty; it is used to secure the constitution of groups using an initiator event.

There are possible variants of the method described in FIG. 4. Thus, if the command transmitter cannot itself detect the initiator event—for example, because the command transmitter is a roving object, not connected to the mains—it can nonetheless trigger its own timer at the instant of its first activation. The counter settings collected in each frame are thus decremented by the setting of the command transmitter counter before being recorded with all the command receiver identifiers during the capture. At the end of the capture phase, these settings are all compared and these will differ to some degree from the mean setting corresponding to the identifiers which are not included.

The way in which the time reference is coded can also be changed. Thus, if the various objects are fitted with an internal timer—for example, to allow time programming by the user—they cannot start a counter, but simply note the date and time of the initiator event. Said date and/or time can then be sent in a message.

The stage 78 consistency test depends on the desired accuracy and computer drift. For timers as currently used on rolling shutters, with a drift of some 300 ms/hour, it is considered that objects which have received a single initiator event must respond with a time indication of approximately 10 ms, for a stage 44 duration supposed to be limited to two minutes. This allows differentiation between initiator events separated by less than 100 ms, and in practice makes any confusion between two groups of objects extremely improbable.

In the example of FIG. 4, the insertion of a time indication into messages sent by command receivers to a command transmitter is described. The method of FIG. 4 is therefore applied to the example from FIG. 3. However, it is understood that the definition of a group among the of command receivers, explained with reference to FIG. 4, can be implemented for purposes other than the pairing described with reference to FIG. 3. In the case of home automation operators, the method of FIG. 4 is implemented for the definition of a general command for centralised programming of all the receivers or some of them. More generally, the method of FIG. 4 is used for any sequence on the objects of a group—the group being defined by the initiator event.

Compared with the solution described at FIG. 3, the solution of FIG. 4 ensures greater security, even if the distinct programming sequences are implemented on the objects—which may in particular be the case if the operators are programmed simultaneously in neighbouring apartments.

In the example of FIG. 4, the different objects send all the messages; this is relevant insofar as the different objects act as command receivers, and send their identifier to the command transmitter for pairing; to form a group, this solution is not mandated; it suffices that a single object provides to the others a time indication in order that the other objects can determine whether or not they belong to the same group as that which has provided the indication. Thus the list of objects from a group could be generated by sending a command with a time indication from an object; the other objects having the same time indication could thus be declared. This solution limits the exchanges to the extent that only the group members are declared.

The FIG. 4 solution is implemented simply by programming the command receivers to send a time reference in one or all messages.

FIG. 5 shows a flow chart of the method implemented in a bidirectional object used as a command receiver. An initiator event consisting of a double power cut is assumed in the example of the figure, as described in FIG. 3, without the time verification of FIG. 4. At the start (stage 84), the command receiver is waiting for an initiator event. At stage 86, the command receiver detects an initiator event; as explained earlier, at stage 88 it sends its identifier and an indication that it is available for pairing; the possible repetition of this transmission to manage collisions has not been shown at stage 88. The command receiver than waits for a temporary allocation command. At stage 90, it receives a temporary allocation command and stores the identifier of the command transmitter to which it is allocated temporarily.

At stage 92, on receipt of a message, the command receiver checks whether the message is from the command transmitter to which it has been allocated. If this is not the case, it moves to stage 94, where the message is ignored and reverts to waiting for a new message.

If the message received is from the command transmitter to which it is allocated, the command receiver executes the instructions contained in the message. More precisely, it tests in 96 whether the instructions are pairing instructions. If this is the case, the receiver moves to 98, where it is paired and then operates in paired mode and responds only to the transmitter to which it is paired. If the instructions are not pairing instructions, it tests in 100 whether these are release instructions.

If this is the case, the command receiver is released without having been paired; the program returns to stage 86, to wait for a new initiator event; if not the receiver moves to stage 102, in which the instructions are executed, and then returns to stage 92, to wait for a new message from the command transmitter to which it is paired. The instructions executed at stage 102 may be, for example, instructions to execute a response command for visual identification of the command receiver via the product which it controls.

The flow chart of FIG. 5 does not show the case of a release after a set period, mentioned as an alternative solution in the description of FIG. 3. The order of stages 96, 98, 100 and 102 could also be alternated, or some of these stages could be eliminated, depending on the instructions sent during the temporary pairing.

FIG. 6 shows a flow chart of the method implemented in a bidirectional object used as a command transmitter; as in the example of FIG. 3, a command transmitter using Stop and Prog buttons for the pairing process is assumed. The command transmitter is switched on at stage 110. Said switching on then makes the command transmitter sensitive to transmissions by command receivers of their identifier. This switching on may consist of a particular action on the command transmitter; it may simply be applying a voltage to the command transmitter, which is followed by automatic switching on.

At stage 112, the command transmitter receives transmissions from the command receivers and containing their identifiers; see stage 44 of FIG. 3. The command transmitter can thus build up a list of command receivers available for a temporary allocation.

If the command receivers send a time reference, as explained at stage 74 of FIG. 4, building up the list at stage 112 may involve comparing time references, as explained by reference to FIG. 4. From this point of view, although the probability is low, it is possible in an installation site covering, for example, several office floors or apartments that there is an overlap of two initiator events applying to a comparable number of objects. In this case, a consistency test of the time references sent by the command receivers cannot say which objects belong to the correct group. The consistency test is designed so as to reject all identifiers if all are not in a consistent time slot, or even to reject all if the proportion of inconsistent identifiers exceeds a given threshold. In this case, all that has to be done is to trigger a new initiator event to form the group.

It can also be envisaged that the various command receivers be declared only on receipt of a signal from the command transmitter, showing that it is ready to receive their log in and their identifier. However, this adds a stage and extends the internal clock counting time.

At stage 114, the command transmitter sends a temporary allocation command. This command is accompanied by a time reference if the principle proposed in FIG. 4 is used. This solution avoids temporary allocation of command receivers which are not in the intended group. A temporary allocation command can also be sent to command receivers on the list; this is more certain, but prolongs the messages. In the buttons example considered, the Prog button is used to trigger this stage.

The user starts to scroll down the list at stage 116. The Stop button can be used, for example. The Stop button can for example be used. Pressing on this button then causes the command transmitter to send a response command.

Following this response command, an new user command is waited for, stage 118. If the user presses the Stop button, he moves on to the next command receiver—stage 120—and returns to stage 116. As explained earlier, the order of scrolling through the list is immaterial.

If the user presses the Prog command at stage 118, he moves to stage 122, which is the pairing stage. This stage consists of simply sending a pairing command to the command receiver to which the response request has just been sent. Exchanges can also be simpler or more complex, as mentioned previously.

After this stage, a release command is sent, as shown at stage 124; either a second press on the Prog key is used, or a fresh press on the Stop key, or any combination of keys. The program is then terminated and the command transmitter is used in standard mode to control the paired command receivers. As explained earlier, sending a release command is not essential. Automatic release after a predetermined time is also an option. Yet again, the list can be scrolled to pair another command receiver, as explained above; this avoids the need to build up a list again for a new pairing.

The flow chart of FIG. 6 is schematic and, in particular, does not show systematically the waiting stages before a user presses a button.

Of course, the invention is not limited to the embodiments given above. Thus, in the example of FIG. 3, the receiver in the list to be paired could also be chosen directly, without moving through stages 52, 54 and 58. This could also be the case, for example, if a command transmitter had to be paired to each receiver in any order. This could also be the case if a programming console showing receiver identifiers is used as a command transmitter allocated temporarily.

The radio transmission used between a transmitter and a receiver is given only by way of example and can be modified. The invention applies in particular when the transmitters and receivers use a single frequency or each transmit on a separate frequency, or by frequency hopping, or with different modulations. In fact, the method applies immediately command transmitters or command receivers are "bidirectional objects" capable of sending and receiving.

The terms "command receivers" and "operators" have been used, which apply in particular to the example of rolling shutter operators. The receiver and the operator can be separate items, as in the examples, or form a single assembly—for example, by integrating the command receiver in the operator.

In the examples, transmitters send their address to the receiver while sending a command; clearly, the relevant address can be coded or encrypted, by using techniques that are well known in the state of the art.

Specific embodiments of a method for pairing bidirectional objects according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method for pairing a bidirectional object acting as a command receiver with a bidirectional object acting as a command transmitter, the command receiver having three distinct states: a first state in which the command receiver is not paired, a second state in which the command receiver is allocated temporarily to a command transmitter, and a third state in which the command receiver is paired to a command transmitter, the method comprising the following stages:
   (a) temporarily allocating a plurality of command receivers to a command transmitter, the temporary allocation moving the command receivers from the first state to the second state and rendering the command receiver responsive to only commands from the command transmitter to which it is allocated; then
   (b) selecting a command receiver from among the plurality of temporarily allocated objects by:
      (b1) the command transmitter sending a response request command to one of the temporarily allocated objects;
      (b2) the response request command recipient responding by sending a signal that allows a user to visually or audibly identify the response request command recipient;
      (b3) if the user determines that the response request command recipient is not a desired object for pairing, repeating the stage of sending a response request command, but to another of the temporarily allocated objects; and
      (b4) if the user determines that the response request command recipient is the desired object for pairing, proceeding to step (c);
   (c) sending a pairing command from the command transmitter to the command receiver,
      (c1) the command receiver moving from the second state to the third state upon receipt of the pairing command; and
      (c2) the command receiver being non-responsive to initiator events while in the third state, and then
   (d) releasing the temporarily allocated objects distinct from the paired object, the non-selected command receivers going from the second state to the first state.

2. The method according to claim 1, further including an iteration of the selection (b) and pairing stages (c).

3. The method according to claim 1, wherein the temporary allocation stage comprises:
   (a1) in response to an initiator event, sending by at least one bidirectional object acting as a command receiver of its identifier;
   (a2) sending by a bidirectional object acting as a command transmitter of its identifier;
   (a3) storage by a bidirectional object acting as a command receiver of the identifier of the bidirectional object acting as a command transmitter; and
   (a4) storage by the bidirectional object acting as the command transmitter of the identifier of each bidirectional object acting as a command receiver.

4. The method according to claim 3, wherein the stage (a1) comprises sending with the identifier a time reference dependent at the instant of the initiator event.

5. The method according to claim 4, wherein the stage (a4) comprises storage of the identifiers of the bidirectional objects acting as command receivers having identical or similar time references.

6. The method according to claim 1, wherein the release stage (d) comprises releasing the temporarily allocated objects distinct from the paired object, in the absence of receiving a command during a set period.

7. The method according to claim 1, wherein the release stage (d) comprises the release of a temporarily allocated object on receiving a pairing command addressed to another temporarily allocated object.

8. The method according to claim 1, wherein the release stage(d) comprises the sending by the object acting as command transmitter of a release command.

9. The method according to claim 1, wherein the pairing stage comprises the pairing to the selected object of the bidirectional object to which the selected object was allocated.

10. The method according to claim 1, wherein the pairing stage comprises the pairing to the selected object of a different bidirectional object to the bidirectional object to which the selected object was allocated.

11. A method of operating a bidirectional object acting as a command receiver having three distinct states: a first state in which the command receiver is not paired, a second state in which the command receiver is allocated temporarily to a bidirectional object acting as a command transmitter, and a third state in which the command receiver is paired to a command transmitter, the method comprising:
 (a) temporarily allocating the command receiver to the command transmitter, the temporary allocation causing the command receiver to move from the first state to the second state, the command receiver obeying any command received from the command transmitter to which it is allocated and only responding to the command transmitter to which it is allocated while it is in the second state;
 (b) transmitting a response request command from the command transmitter;
 (c) responding to the response request command sent by the command transmitter with a visual or audible signal that allows a user to identify the command receiver that received the response request command; and
 (d) receiving an instruction from the user after the sending of the visual or audible signal;
 (e) sending a pairing command from the command transmitter to be paired, to the command receiver that responded to the response request command;
 (f) changing the command receiver from the second state to the third state, the command receiver being non-responsive to an initiator event while it is in the third state.

12. The method according to claim 11, wherein the temporary allocation stage comprises:
 (a1) in response to an initiator event, sending an identifier;
 (a2) receipt of an identifier; and
 (a3) storage of a received identifier.

13. The method according to claim 12, wherein the sending stage comprises sending with the identifier a time reference dependent on the instant of the initiator event.

14. The method according to claim 11, wherein the release stage comprises release on receipt of a pairing command addressed to another object.

15. The method according to claim 11, wherein the release stage comprises release on receipt of a release command.

16. The method according to claim 11, wherein the pairing stage comprises pairing to the said bidirectional object acting as the command transmitter.

17. The method according to claim 11, wherein the pairing stage comprises pairing to a bidirectional object other than said object acting as the command transmitter.

18. The method of claim 11, including a bidirectional object, the object having:
 a reception stage;
 a transmission stage; and
 a logic unit controlling the reception stage and the transmission stage.

19. A method for operating a bidirectional object acting as a command transmitter comprises the following stages:
 (a) receipt and storage of the identifier of at least one bidirectional object acting as a command receiver having three distinct states, wherein in the first state the command receiver is not paired, in the second state the command receiver is allocated temporarily to the command transmitter and in the third state the command receiver is paired to a command transmitter;
 (b) sending a temporary allocation command to one of the objects whose identifier has been stored, said temporary allocation command prohibiting the command receiver from responding to other command transmitters and ensuring that the command receiver obeys any command received from the command transmitter to which it is allocated;
 (c) sending a response request command to one of the objects whose identifier has been stored, said object responding to the response request command with a visual or audible signal that allows the user to identify the command receiver; and
 (d) depending on an instruction from the user based on the visual or audible signal, sending a pairing command to said object by sending a pairing command using the command transmitter to be paired, said pairing command prohibiting said object from responding to an initiator event.

20. The method according to claim 19, wherein stages (c) and (d) are repeated.

21. The method according to claim 19, further including a sending stage (e) of a command releasing objects whose identifiers have been stored and separate from a paired object to which the pairing request command has been sent.

22. The method according to claim 21, wherein the sending stage (e) comprises sending a release command.

23. The method according to claim 19, wherein the reception stage comprises the comparison of received time references with said identifiers and storage of identifiers having the same or similar time references.

24. The method according to claim 19, wherein the sending stage (c) comprises:
 (c1) sending a response request command to one of the objects whose identifier has been stored;
 (c2) sending a response request command to another of the objects whose identifier has been stored;
 and in that stage (d) comprises sending a pairing command to the object to which the previous response request command was addressed.

25. The method according to claim 19, wherein in the stage (d), the pairing command includes the identifier of another object.

26. The method of claim 19, including a bidirectional object, the object having:
 a reception stage;
 a transmission stage; and
 a logic unit controlling the reception stage and the transmission stage.

* * * * *